United States Patent
Lee et al.

(10) Patent No.: US 8,204,849 B2
(45) Date of Patent: Jun. 19, 2012

(54) WEB PRODUCT INTERFACE SYSTEM AND METHOD

(75) Inventors: Patrick R Lee, Bolingbrook, IL (US); Shyhshiun Chen, Naperville, IL (US)

(73) Assignee: CA, Inc., Islandia, NY (US)

(*) Notice: Subject to any disclaimer, the term of this patent is extended or adjusted under 35 U.S.C. 154(b) by 668 days.

(21) Appl. No.: 10/887,750

(22) Filed: Jul. 9, 2004

(65) Prior Publication Data

US 2005/0119906 A1 Jun. 2, 2005

Related U.S. Application Data

(63) Continuation of application No. 60/485,954, filed on Jul. 10, 2003.

(51) Int. Cl.
*G06F 17/20* (2006.01)
*G06F 15/16* (2006.01)

(52) U.S. Cl. ............................. 707/602; 707/811
(58) Field of Classification Search .............. 707/602, 707/756, 811
See application file for complete search history.

(56) References Cited

U.S. PATENT DOCUMENTS

| | | | |
|---|---|---|---|
| 6,209,124 B1 | 3/2001 | Vermeire et al. | |
| 6,446,110 B1 | 9/2002 | Lection et al. | |
| 6,502,236 B1 | 12/2002 | Allen et al. | |
| 6,523,042 B2 | 2/2003 | Milleker et al. | |
| 6,550,054 B1 | 4/2003 | Stefaniak | |
| 6,578,195 B1 | 6/2003 | Zaringhalam | |
| 6,675,353 B1 | 1/2004 | Friedman | |
| 6,687,873 B1 | 2/2004 | Ballantyne et al. | |
| 6,757,869 B1 | 6/2004 | Li et al. | |
| 6,760,804 B1 | 7/2004 | Hunt et al. | |
| 2002/0035576 A1* | 3/2002 | Kishimoto et al. | 707/200 |
| 2002/0049788 A1 | 4/2002 | Lipkin et al. | 707/513 |
| 2002/0072970 A1* | 6/2002 | Miller et al. | 705/14 |
| 2002/0087356 A1* | 7/2002 | Andros et al. | 705/2 |
| 2002/0194302 A1* | 12/2002 | Blumberg | 709/217 |
| 2003/0061283 A1 | 3/2003 | Dutta et al. | 709/204 |
| 2003/0061309 A1* | 3/2003 | Brown et al. | 709/218 |
| 2004/0034624 A1* | 2/2004 | Deh-Lee et al. | 707/3 |

FOREIGN PATENT DOCUMENTS

| | | |
|---|---|---|
| CA | 2310660 A | 12/2001 |
| WO | WO 00/52603 | 9/2000 |
| WO | WO 03/001413 A | 1/2003 |
| WO | WO 03/007189 A | 1/2003 |

OTHER PUBLICATIONS

International Search Report issued in PCT/US2004/022011; Jan. 7, 2005; 7 pages.

* cited by examiner

*Primary Examiner* — John E Breene
*Assistant Examiner* — Alex Gofman
(74) *Attorney, Agent, or Firm* — Pillsbury Winthrop Shaw Pittman LLP

(57) ABSTRACT

A method for interfacing products with a web browser comprises retrieving a product profile, the product profile associated with one product. An agent type is determined based, at least in part, on the product profile. Data is retrieved from the product based on the agent type and processed such that the data is accessible by the web browser.

21 Claims, 2 Drawing Sheets

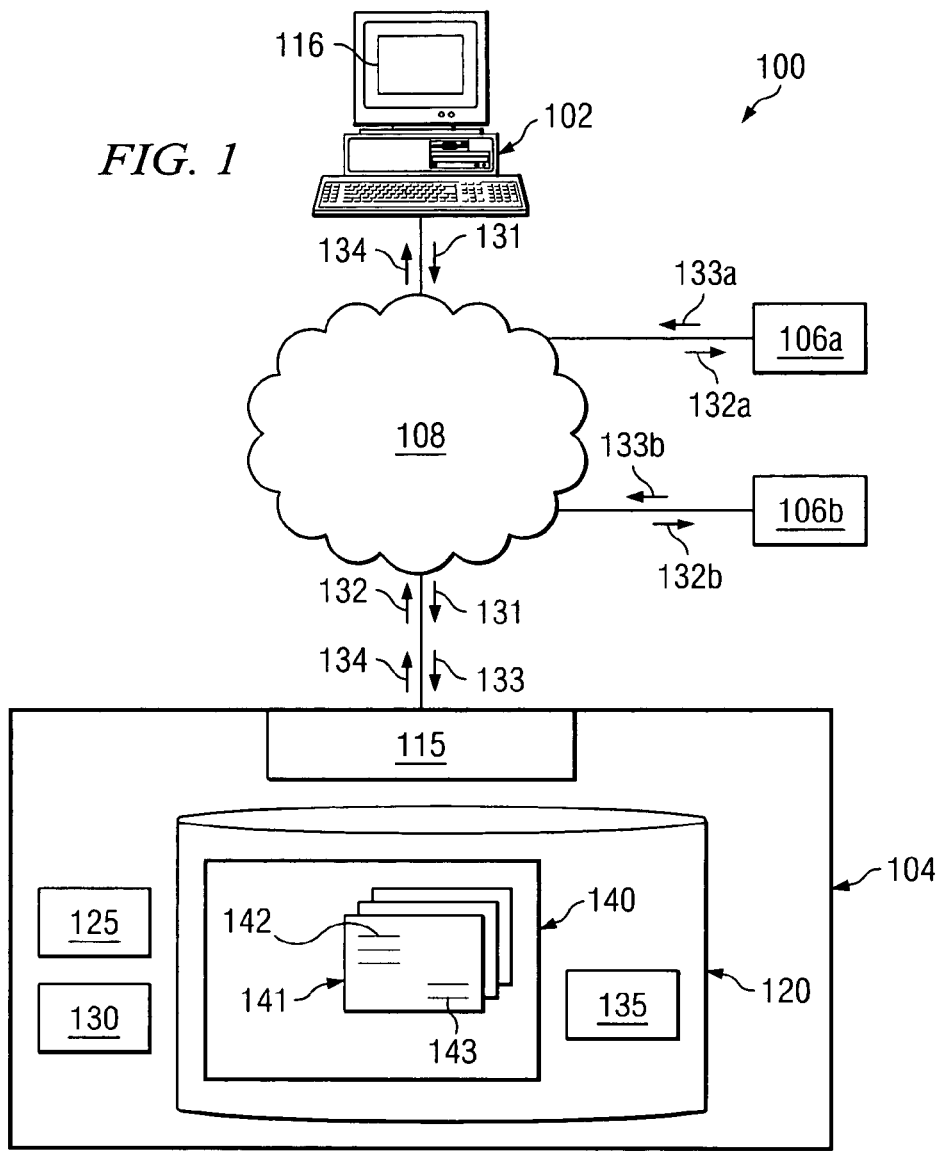

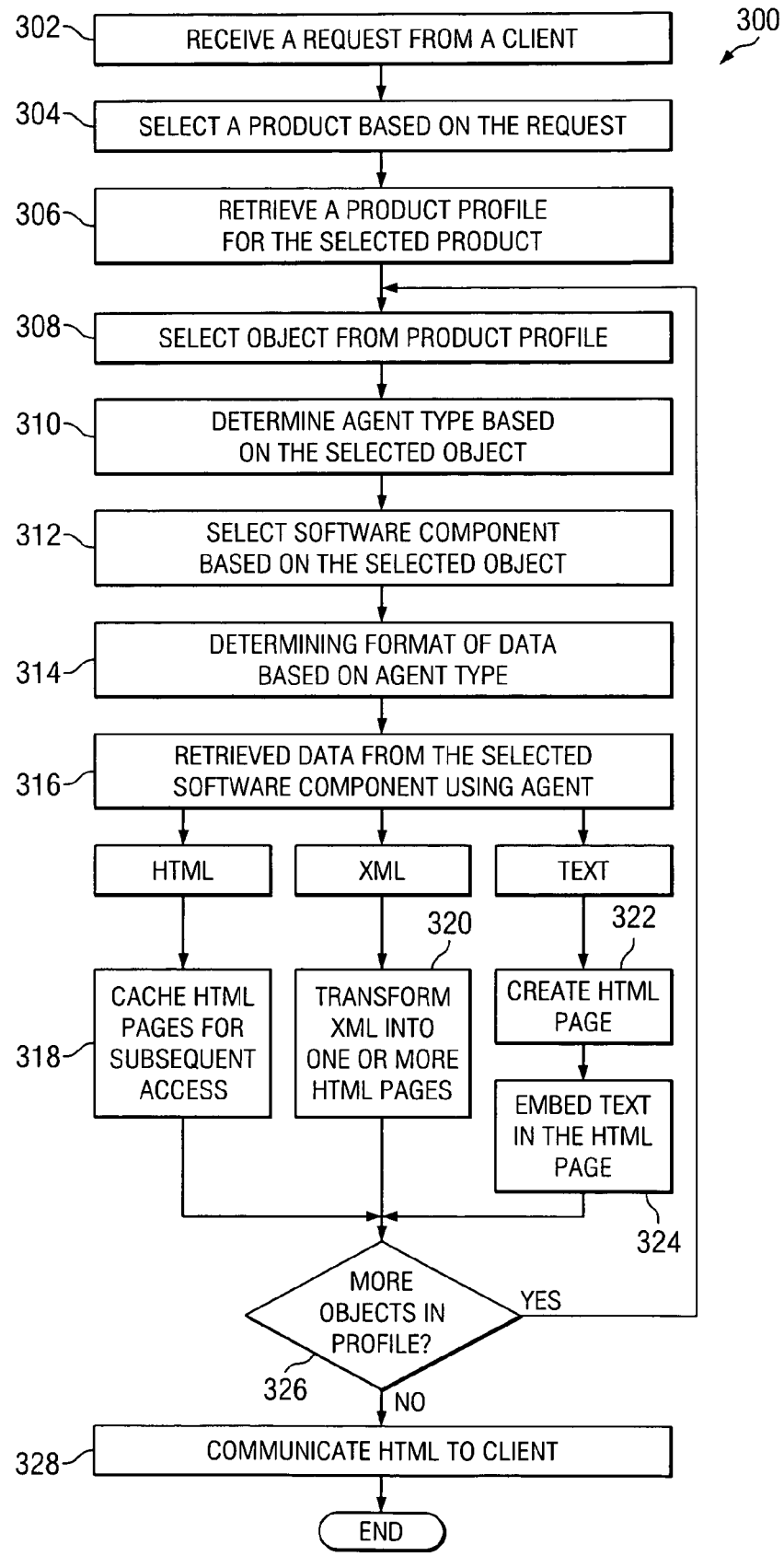

WEB PRODUCT INTERFACE SYSTEM AND METHOD

CROSS-REFERENCE TO RELATED APPLICATIONS

This application claims the benefit of U.S. Provisional Patent Application Ser. No. 60/485,954, entitled "Web Product Interface System and Method," filed Jul. 10, 2003, the contents of which are hereby incorporated by reference in their entirety.

TECHNICAL FIELD

This disclosure relates generally to the field of data processing and, more particularly, to a web product interface system and method.

BACKGROUND

Conventional software products normally provide interfaces that enable a user to view data processed by the particular software product. These software products are normally created by different companies and developers. Often, the various products provide different data formats and interfaces to the user. Moreover, certain legacy systems can present data to the user using older formats that are not compatible with modern systems or web browsers.

SUMMARY

This disclosure provides a web product interface system and method. In one embodiment, a method for interfacing products with a web browser comprises retrieving a product profile, the product profile associated with one product. An agent type is determined based, at least in part, on the product profile. Data is retrieved from the product based on the agent type and processed such that the data is accessible by a web browser. The details of one or more embodiments of the disclosure are set forth in the accompanying drawings and the description below. Particular features, objects, and advantages of the disclosure will be apparent from the description and drawings and from the claims.

DESCRIPTION OF THE DRAWINGS

FIG. 1 illustrates a system providing a web product interface according to one embodiment of the present disclosure;

FIG. 2 illustrates an example agent type-data format matrix used by the system of FIG. 1; and FIG. 3 is a flow chart illustrating an example method for providing a web product interface according to one embodiment of the present disclosure.

DETAILED DESCRIPTION

FIG. 1 illustrates a system 100 for providing a web product interface. At a high level, system 100 is a client/server environment comprising at least one client 102, a server 104, and one or more, at least partially disparate, target agents 106, but may also be a standard computing environment or any other suitable environment. In general, system 100 comprises a system for providing client 102 with a web product interface 116 to one or more target agents 106 based on product profiles 141 normally stored on server 104. For example, system 100 may comprise an enterprise security management system that allows server 104 to retrieve multiple formats of data from a plurality of target security agents 106 and unify the data into a singular format for presentation to client 102. System 100 retrieves the appropriate data format from target agent 106 and automatically processes the retrieved data, regardless of format, to generate HyperText Markup Language (HTML) pages accessible by the web product interface. The term "automatically," as used herein, generally means that the appropriate processing is substantially performed by system 100. It should be understood that automatically further contemplates any suitable user interaction with system 100. In one embodiment, system 100 allows clients 102 to quickly integrate with server 104 such that client 102 can view product output from both legacy and web-enabled products, each identified by a target agent 106.

Each client 102 may include input devices, output devices, mass storage media, processors, memory, interfaces, communication ports, or other appropriate components for communicating client requests 131 to server 104 and viewing the generated output. It will be understood that there may be any number of clients 102 coupled to server 104. As used in this document, client 102 is intended to encompass a personal computer, workstation, network computer, kiosk, wireless data port, personal data assistant (PDA), one or more processors within these or other devices, or any other suitable processing device. Moreover, "client 102" and "user of client 102" may be used interchangeably without departing from the scope of this disclosure. For example, client 102 may comprise a computer that includes an input device, such as a keypad, touch screen, mouse, or other device that can accept information, and an output device that conveys information associated with the operation of server 104 or clients 102, including digital data, visual information, or product profiles 141. Both the input device and output device may include fixed or removable storage media such as a magnetic computer disk, CD-ROM, or other suitable media to both receive input from and provide output to users of clients 102 through a portion of the web product interface, namely graphical user interface (GUI) 116.

GUI 116 comprises a graphical user interface operable to allow the user of client 102 to interface with system 100 and view the output of a plurality of software products. Generally, GUI 116 provides the user of client 102 with an efficient and user-friendly presentation of data provided by system 100, such as a unified display of disparate output. GUI 116 may comprise a plurality of displays having interactive fields, pull-down lists, and buttons operated by the user. In one example, GUI 116 presents the formatted output and receives commands from client 102. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in system 100 and efficiently presents the information to the user. Server 104 can accept data from client 102 via the web browser (e.g., Microsoft Internet Explorer or Netscape Navigator) and return the appropriate HTML or eXtensible Markup Language (XML) responses. Moreover, in one embodiment, the web product interface includes GUI 116. Accordingly, for ease of understanding, the term GUI 116 and a web product interface may be used interchangeably; although, it will be understood that the web product interface will often include more functionality than a graphical user interface.

Server 104 includes memory 120 and processor 125 and comprises an electronic computing device operable to receive, transmit, process, and store data associated with system 100. For example, server 104 may comprise a general-purpose personal computer (PC), a Macintosh, a workstation, a Unix-based computer, a server computer, or any other suitable device. According to one embodiment, server 104 may comprise a web server. In short, server 104 may comprise software and/or hardware in any combination suitable to present client 102 with a centralized view of different output from disparate products located at other computers. For example, if server 104 comprises a security server, then security server 104 may provide different security views, reports of security infrastructure, visualizations and reports of security status, reports of various security products, remote control of security, integration with internal or third party security, and any other suitable functionality.

FIG. 1 only provides one example of computers that may be used with the disclosure. For example, although FIG. 1 provides one example of server 104 that may be used with the disclosure, system 100 can be implemented using computers other than servers, as well as a server pool. The present disclosure contemplates computers other than general purpose computers as well as computers without conventional operating systems. As used in this document, the term "computer" is intended to encompass a personal computer, workstation, network computer, or any other suitable processing device. Computer server 104 may be adapted to execute any operating system including UNIX, Windows, or any other suitable operating system.

Server 104 includes interface 115 for communicating with other computer systems, such as client 102 and target agent 106, over network 108 in a client-server or other distributed environment. In certain embodiments, server 104 receives product profiles 141 from network 108 for storage in memory 120. Network 108 facilitates wireless or wireline communication between computer server 104 and any other computer. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 115 comprises logic encoded in software and/or hardware in a suitable combination and operable to communicate with network 108. More specifically, interface 115 may comprise software supporting one or more communications protocols associated with communications network 108 or hardware operable to communicate physical signals.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, memory 120 includes at least product profile repository 140, but may also include any other appropriate data.

Product profile repository 140 is any table, database, file, or object that stores one or more customizable product profiles 141. Product profile repository 140 may receive product profiles 141 through interface 115 or from another process running on server 104. Repository 140 may be of any suitable format including XML documents, flat files, comma-separated-value (CSV) files, SQL tables, relational database tables, and others. Product profile 141 is associated with a software product residing on a remote or external machine. In general, product profile 141 provides an interface between the software product and server 104 or client 102. Product profile 141 comprises any file including at least one object 142, which describes at least the appropriate agent 106 from which the data is to be retrieved, and operable to be processed by server 104. Product profile 141 may be created by client 102, third party software vendor, or any other appropriate user of the respective product or loaded from a default profile. Product profile 141 may be in any electronic format such as, for example, an XML document, comma separated value (CSV) file, EFT record, or any other appropriate data format. In one embodiment, XML is used because it is easily portable, human-readable, and customizable.

Object 142 defines an interface to a particular agent 106, which retrieves the data from the particular software product. Further, object 142 may include the agent type such that server 104 may easily determine the retrieved data format using, for example, agent type-data format matrix 135. An object 142 includes the example parameters below to help server 104 locate the appropriate target agent 106 and retrieve the desired data in the proper format:

(a) Object name
(b) Description
(c) Agent type
(d) Source Type (for Report agent type)
(e) Command (for Report or Command agent type)
(f) Data file subdirectory
(g) Data filename
(h) Pre-processing stylesheet (for XML output)
(i) Post-processing stylesheet (for XML output)
(j) Presentation profile name (for XML output)
(k) Link port number (for XML output)
(l) Supplemental files (for HTML output)
(m) URL (for URL agent type)
(n) Synchronous (for Command agent type)

It will be understood that the list of object parameters is for illustration purposes only and that none, some, or all of the example parameters may be used, as appropriate, without departing from the scope of this disclosure.

Server 104 also includes processor 125. Processor 125 executes instructions and manipulates data to perform the operations of server 104 such as, for example, a central processing unit (CPU), an application specific integrated circuit (ASIC) or a field-programmable gate array (FPGA). Although FIG. 1 illustrates a single processor 125 in server 104, multiple processors 125 may be used according to particular needs, and reference to processor 125 is meant to include multiple processors 125 where applicable. In the embodiment illustrated, server 104 includes web product interface servlet 130 that processes external data based on product profiles 141. Web product interface servlet 130 could include any hardware, software, firmware, or combination thereof operable to receive a client request 131 from client 102, retrieve data from target agent 106 on a target machine in a suitable format, and automatically transform the data such that any generic web browser, such as GUI 116, may access it. For example, web product interface servlet 130 may be written in any appropriate computer language including C, C++, Java, J#, Visual Basic, and others. Further, web product interface servlet 130 may allow client 102 or the software product vendor to submit or customize product profiles 141 such that new products may be quickly and easily integrated with web product interface 116. It will be understood that while web product interface servlet 130 is illustrated as a single multi-tasked module, the features and functionality performed by this engine may be performed by multiple modules such as, for example, a retrieving module, a transforming module, and an editing module. In one embodiment, web product interface servlet 130 loads product profile 141 and automatically formats data retrieved from the target machine by target agent 106. Further, web product interface servlet 130 and GUI 116, alone or in combination, may comprise at least a portion of the web product interface operable to present a plurality of products in a substantially unified format to client 102. In other words, while not illustrated, web product interface servlet 130 may comprise a child module of another local or remote software application.

Target agent 106 typically resides on the computer, or target machine, where the desired data is. Agent 106 may comprise a third party web component or an enterprise agent residing on the target machine. It will be understood that the target machine may be remote or on-site; further, the target machine may represent a separate process running on server 104 or client 102 without departing from the scope of this disclosure. In other words, target agent 106 is any module or component that receives requests or commands from server 104 and retrieves data from the software product residing on target machine. Once the data has been gathered, agent 106 may communicate the data to server 104 or server 104 may retrieve the data from target agent 106, as appropriate. In one example, the target machine may include a legacy software system that is at least partially incapable of outputting data to a web browser in an expected or useful form. In this example, the target machine might include target agent 106 that retrieves the data created by the legacy system and communicates it to server 104 for processing. Server 104 receives this data and transforms it into web-enabled data. As described in more detail below, each agent 106 is categorized by an agent type, often defined by the output format of the data retrieved by agent 106. For illustration purposes only, target agent 106 may be a "URL" agent, an "report" agent, a "text" agent, or any other appropriate agent 106.

In one aspect of operation, client 102 communicates a client request 131 to server 104. Before client request 131 is received by server 104, system 100 may require that client 102 log on to server 104 as appropriate. For example, if system 100 comprises an enterprise security management system, then server 104 may verify or authenticate client 102 first. According to one embodiment, server 104 communicates a menu to GUI 116 for presentation to client 102. Client 102 initiates client request 131 by selecting one of the menu items from GUI 116. Often, the menu item in GUI 116 provides a URL that specifies a particular profile 141, a particular object 142, and/or target agent 106 that will be distributing the desired data. One example client request 131 is: http://sccserver:8080/servlet/eppiservlet?piprofile=profile&piname=name&node=agent It will be understood that example client request 131 is for illustration purposes only and client request 131 may comprise any data in any format as appropriate.

Web product interface servlet 130 receives a client request 131 and loads product profile 141 based on any parameter. For example, as illustrated above, web product interface servlet 130 may extract the desired product profile 141 and object 142 from client request 131. But, in other circumstances, web product interface servlet 130 may locate product profile 141 based upon client characteristics, target agent 106 characteristics, or any other appropriate parameter. Once web product interface servlet 130 loads the appropriate product profile 141, web product interface servlet 130 processes one or more objects 142 stored in product profile 141. For example, web product interface servlet 130 may determine the agent type using object 142 to determine the appropriate format of the data being returned by agent 106. According to one embodiment, web product interface servlet 130 communicates with agent type-data format matrix 135 to determine the data format to be retrieved. Web product interface servlet 130 then communicates a server request 132 to target agent 106; server request 132 includes at least a portion of information retrieved from object 142. Once target agent 106 receives server request 132 and performs the appropriate processing, target agent 106 communicates output 133 from the executed software component. Once output 133 is received by web product interface servlet 130, web product interface servlet 130 processes the retrieved output 133 such that the data is accessible by GUI 116. As illustrated in more detail below, this may include generating HTML pages from text or XML data. Once processing is complete, server 104 communicates processed data 134 to client 102. It will be understood that client 102 communicating client request 131 and client 102 receiving processed data 134 may be the same or different clients 102.

FIG. 2 illustrates an example agent type-data format matrix 235 and is one embodiment of agent type-data format matrix 135 illustrated in FIG. 1. Agent type-data format matrix 235 is a multi-dimensional data structure or object that includes at least one agent type record, entry, parameter, or other object 238. Each agent type record 238 includes multiple columns or characteristics. In this example, agent type record 238 includes an agent type 236 and a retrieved data format 237. It will be understood that each agent type record 238 may include none, some, or all of the example columns or characteristics, as well as others. Moreover, agent type-data format matrix 235 may comprise algorithms or other appropriate logic web product interface servlet 130 as opposed to a traditional data structure without departing from the scope of this disclosure. One technical advantage of agent type-data format matrix 235 is that it allows system 100 to efficiently determine the format type of the data to be retrieved based on agent type 236.

The example agent types 236 shown in agent type-data format matrix 235 are "Report", "URL", and "Command". One target agent 106 of agent type 236 "Report" may communicate data to server 104 that is in "HTML", "text", or "XML" data format 237. Another target agent 106 of "URL" agent type 236 may communicate data to server 104 that is in "XML" data format 237. Yet another target agent 106 of "Command" agent type 236 may not communicate any data to server 104 other than an "execution complete" message to server 104. Of course, the agent types 236 illustrated in agent type-data format matrix 235 are merely exemplary. System 100 contemplates any other suitable agent type 236 that is compatible with the target machine and the respective software product and provides data to web product interface servlet 130 that may be processed and provided to client 102 via the web product interface.

FIG. 3 illustrates a flow chart of an exemplary method 300 for providing a web product interface using product profiles 141. Method 300 is described in respect to system 100. However, any other suitable system may use method 300 to provide the web product interface without departing from the scope of this disclosure. Generally, method 300 describes server 104 presenting a plurality of product interfaces to client 102 using at least one product profile 141 for each desired product processed by target agent 106.

Server 104 receives a client request 131 from a client 102 via network 108 at step 302. As described above, client request 131 may be communicated to server 104 using any appropriate technique or medium. For example, server 104 may present a menu, where each menu item includes a different client request 131. At step 304, web product interface servlet 130 selects a product, namely a software product, based on received client request 131. Next, web product interface servlet 130 retrieves a product profile 141 for the selected product. According to one embodiment, product profile 141 is in XML format and includes one or more objects or tags 142. Accordingly, at step 308, web product interface servlet 130 selects a first object 142 from retrieved product profile 141. Web product interface servlet 130 determines the type of target agent 106 based on selected object 142 at step 310. At step 312, web product interface servlet 130 selects the appropriate software component located on the target machine using selected object 142.

At step 314, web product interface servlet 130 determines the format of the retrieved data based upon the determined agent type at step 310. Once the agent type and the location of target agent 106 have been identified or otherwise determined, web product interface servlet 130 retrieves or receives output 133 from the selected software component, via agent 106, based on the agent type at step 316. Once the output 133 data has been retrieved, server 104 processes output 133 according to the format of the retrieved data. For example if the retrieved data is HTML, then, at step 318, web product interface servlet 130 caches the HTML pages for subsequent access. If the retrieved data 133 is in XML format, then web product interface servlet 130 transforms the XML into one or more HTML pages at step 320. According to one embodiment, this transformation may occur through eXtensible Stylesheet Language: Transformations (XSLT). If the retrieved data type is text, then server 104 creates an HTML page at step 322. Then, at step 324, web product interface servlet 130 imbeds the retrieved text into the created HTML page at step 324. Once all the retrieved data has been formatted for subsequent access by web browser 116, at decisional step 326, web product interface servlet 130 determines that there are more objects 142 in profile 141. If there are more objects 142 in product profile 141, then processing returns to step 308 where the next object 142 is selected. Once all objects 142 in product profile 141 have been appropriately processed, server 104 communicates the one or more HTML pages to client 102 for display in the web product interface at step 328.

The preceding flowchart and accompanying description illustrate only an exemplary method 300 for server 104 to provide a web product interface using product profiles 141. However, system 100 contemplates server 104 using any suitable technique for performing these tasks. Thus, many of the steps in this flowchart may take place simultaneously and/or in different orders than as shown. Moreover, server 104 may use methods with additional steps, fewer steps, and/or different steps, so long as the methods remain appropriate.

Although the present disclosure has been described in detail, it should be understood that various changes, substitutions and alterations can be made hereto without departing from the sphere and scope of the disclosure as defined by the appended claims.

What is claimed is:

1. A computer-implemented method for providing a web product interface, comprising:
    storing a plurality of product profiles in a product profile repository located on a server, wherein the plurality of product profiles provide interfaces at the server to multiple agents that retrieve multiple different datasets from multiple different software products that generate the multiple different datasets in multiple different product formats;
    receiving, at an interface in the server, a request to retrieve a plurality of the multiple different datasets from a client remote from the server, wherein the request identifies a plurality of the multiple different software products that generate the plurality of the multiple different datasets, and wherein the remote client selects one or more menu items from a menu that the server presents to the remote client to initiate the request and specify one or more particular product profiles among the plurality of product profiles that will be used to generate the plurality of the multiple different datasets;
    selecting, using the interface at the server, the identified plurality of the multiple different software products in response to the request received from the remote client, wherein the selected plurality of the multiple different software products reside on one or more machines located remotely from the server and the remote client;
    identifying, at the server, a plurality of the multiple agents associated with the selected plurality of the multiple different software products, wherein the server identifies the plurality of the multiple agents from the plurality of product profiles stored in the product profile repository in the server;
    requesting, by the server, the plurality of the multiple different datasets from the identified plurality of the multiple agents, wherein the identified plurality of the multiple agents retrieve the requested plurality of the multiple different datasets from the selected plurality of the multiple different software products;
    receiving, at the server, the requested plurality of the multiple different datasets from the identified plurality of the multiple agents, wherein the server receives the requested plurality of the multiple different datasets in a plurality of the multiple different product formats generated by the selected plurality of the multiple different software products;
    transforming, at the server, the plurality of the multiple different datasets received from the identified plurality of the multiple agents in the plurality of the multiple different product formats into a unified format compatible with a web browser located on the remote client, wherein the server transforms the plurality of the multiple different datasets into the unified format regardless of the product formats in which the selected plurality of the multiple different software products generate the plurality of the multiple different datasets; and
    providing the plurality of the multiple different datasets transformed into the unified format from the server to the remote client in response to the request, wherein the web browser located on the remote client outputs the plurality of the multiple different datasets in the unified format, and wherein the plurality of the multiple different datasets are incompatible with the web browser prior to the server transforming the plurality of the multiple different datasets into the unified format.

2. The computer-implemented method of claim 1, wherein the identified plurality of the multiple agents communicate a plurality of commands to the selected plurality of the multiple different software products to retrieve the requested plurality of the multiple different datasets from the selected plurality of the multiple different software products in the plurality of the multiple different product formats.

3. The computer-implemented method of claim 1, wherein the server uses an agent type-data format matrix that associates the plurality of the multiple agents with the plurality of the multiple different product formats to transform the plurality of the multiple different datasets into the unified format.

4. The computer-implemented method of claim 1, wherein the server identifies the plurality of the multiple agents from a plurality of objects in the plurality of product profiles that associate the selected plurality of the multiple different software products with the identified plurality of the multiple agents.

5. The computer-implemented method of claim 4, wherein the plurality of objects in the plurality of product profiles include one or more parameters that associate the selected plurality of the multiple different software products with the identified plurality of the multiple agents.

6. The computer-implemented method of claim 1, wherein the server locates the plurality of product profiles used to identify the plurality of the multiple agents based on one or more characteristics of the remote client.

7. The computer-implemented method of claim 1, wherein the web browser located on the remote client comprises a generic web browser configured to output the plurality of the multiple different datasets in the unified format.

8. A system for providing a web product interface, comprising:
- a product profile repository configured to store a plurality of product profiles at a server, wherein the plurality of product profiles provide interfaces at the server to multiple agents that retrieve multiple different datasets from multiple different software products that generate the multiple different datasets in multiple different product formats; and
- one or more machines located remotely from the product profile repository, wherein the one or more machines include a memory configured to store the multiple different software products that generate the multiple different datasets in the multiple different product formats, wherein the server has one or more processors configured to:
  - receive, at an interface in the server, a request to retrieve a plurality of the multiple different datasets from a client remote from the server, wherein the request identifies a plurality of the multiple different software products that generate the plurality of the multiple different datasets, wherein the remote client selects one or more menu items from a menu that the server presents to the remote client to initiate the request and specify one or more particular product profiles among the plurality of product profiles that will be used to generate the plurality of the multiple different datasets;
  - select, using the interface, the identified plurality of the multiple different software products in response to the request received from the remote client, wherein the selected plurality of the multiple different software products reside on the one or more remote machines;
  - identify, at the server, a plurality of the multiple agents associated with the selected plurality of the multiple different software products, wherein the server identifies the plurality of the multiple agents from the plurality of product profiles stored in the product profile repository in the server;
  - request the plurality of the multiple different datasets from the identified plurality of the multiple agents, wherein the identified plurality of the multiple agents retrieve the requested plurality of the multiple different datasets from the selected plurality of the multiple different software products;
  - receive the requested plurality of the multiple different datasets from the identified plurality of the multiple agents, wherein the server receives the requested plurality of the multiple different datasets in a plurality of the multiple different product formats generated by the selected plurality of the multiple different software products;
  - transform the plurality of the multiple different datasets received from the identified plurality of the multiple agents in the plurality of the multiple different product formats into a unified format compatible with a web browser located on the remote client, wherein the server transforms the plurality of the multiple different datasets into the unified format regardless of the product formats in which the selected plurality of the multiple different software products generate the plurality of the multiple different datasets; and
  - provide the plurality of the multiple different datasets transformed into the unified format from the server to the remote client in response to the request, wherein the web browser located on the remote client outputs the plurality of the multiple different datasets in the unified format, and wherein the plurality of the multiple different datasets are incompatible with the web browser prior to the server transforming the plurality of the multiple different datasets into the unified format.

9. The system of claim 8, wherein the identified plurality of the multiple agents communicate a plurality of commands to the selected plurality of the multiple different software products to retrieve the requested plurality of the multiple different datasets from the selected plurality of the multiple different software products in the plurality of the multiple different product formats.

10. The system of claim 8, wherein the server uses an agent type-data format matrix that associates the plurality of the multiple agents with the plurality of the multiple different product formats to transform the plurality of the multiple different datasets into the unified format.

11. The system of claim 8, wherein the server identifies the plurality of the multiple agents from a plurality of objects in the plurality of product profiles that associate the selected plurality of the multiple different software products with the identified plurality of the multiple agents.

12. The system of claim 11, wherein the plurality of objects in the plurality of product profiles include one or more parameters that associate the selected plurality of the multiple different software products with the identified plurality of the multiple agents.

13. The system of claim 8, wherein the server locates the plurality of product profiles used to identify the plurality of the multiple agents based on one or more characteristics of the remote client.

14. The system of claim 8, wherein the web browser located on the remote client comprises a generic web browser configured to output the plurality of the multiple different datasets in the unified format.

15. A computer readable storage medium storing computer executable instructions for providing a web product interface, wherein executing the instructions on one or more processors causes the one or more processors to:
- store a plurality of product profiles in a product profile repository located on a server, wherein the plurality of product profiles provide interfaces to multiple agents that retrieve multiple different datasets from multiple different software products that generate the multiple different datasets in multiple different product formats;
- receive, at an interface in the server, a request to retrieve a plurality of the multiple different datasets from a client remote from the server, wherein the request identifies a plurality of the multiple different software products that generate the plurality of the multiple different datasets, and wherein the remote client selects one or more menu items from a menu that the server presents to the client to initiate the request and specify one or more particular product profiles among the plurality of product profiles that will be used to generate the plurality of the multiple different datasets;

select, using the interface at the server, the identified plurality of the multiple different software products in response to the request received from the remote client, wherein the selected plurality of the multiple different software products reside on one or more machines located remotely from the server and the remote client;

identify, at the server, a plurality of the multiple agents associated with the selected plurality of the multiple different software products, wherein the server identifies the plurality of the multiple agents from plurality of product profiles stored in the product profile repository;

determine, at the server, the particular product format for the particular dataset identified in the respective request based on the identified agent associated with the selected software product;

request, by the server, the plurality of the multiple different datasets from the identified plurality of the multiple agents, wherein the identified plurality of the multiple agents retrieve the requested plurality of the multiple different datasets from the selected plurality of the multiple different software products;

receive, at the server, the requested plurality of the multiple different datasets from the identified plurality of the multiple agents, wherein the server receives the requested plurality of the multiple different datasets in a plurality of the multiple different product formats generated by the selected plurality of the multiple different software products;

transform, at the server, the plurality of the multiple different datasets received from the identified plurality of the multiple agents in the plurality of the multiple different product formats into a unified format compatible with a web browser located on the remote client, wherein the server transforms the plurality of the multiple different datasets into the unified format regardless of the product formats in which the selected plurality of the multiple different software products generate the plurality of the multiple different datasets; and provide the plurality of the multiple different datasets transformed into the unified format from the server to the remote client in response to the request, wherein the web browser located on the remote client outputs the plurality of the multiple different datasets in the unified format, and wherein the plurality of the multiple different datasets are incompatible with the web browser prior to the server transforming the plurality of the multiple different datasets into the unified format.

16. The computer readable storage medium of claim 15, wherein executing the instructions on the one or more processors further causes the one or more processors to cause the identified plurality of the multiple agents communicate a plurality of commands to the selected plurality of the multiple different software products to retrieve the requested plurality of the multiple different datasets from the selected plurality of the multiple different software products in the plurality of the multiple different product formats.

17. The computer readable storage medium of claim 15, wherein the server uses an agent type-data format matrix that associates the plurality of the multiple agents with the plurality of the multiple different product formats to transform the plurality of the multiple different datasets into the unified format.

18. The computer readable storage medium of claim 15, wherein the server identifies the plurality of the multiple agents from a plurality of objects in the plurality of product profiles that associate the selected plurality of the multiple different software products with the identified plurality of the multiple agents.

19. The computer readable storage medium of claim 18, wherein the plurality of objects in the plurality of product profiles include one or more parameters that associate the selected plurality of the multiple different software products with the identified plurality of the multiple agents.

20. The computer readable storage medium of claim 15, wherein the server locates the plurality of product profiles used to identify the plurality of the multiple agents based on one or more characteristics of the remote client.

21. The computer readable storage medium of claim 15, wherein the web browser located on the remote client comprises a generic web browser configured to output the plurality of the multiple different datasets in the unified format.

* * * * *

UNITED STATES PATENT AND TRADEMARK OFFICE
CERTIFICATE OF CORRECTION

| | | |
|---|---|---|
| PATENT NO. | : 8,204,849 B2 | Page 1 of 1 |
| APPLICATION NO. | : 10/887750 | |
| DATED | : June 19, 2012 | |
| INVENTOR(S) | : Patrick R. Lee et al. | |

It is certified that error appears in the above-identified patent and that said Letters Patent is hereby corrected as shown below:

Title page, please delete Item (63).

Title page, please insert Item (60) as follows:

(60) Provisional application No. 60/485,954, filed on Jul. 10, 2003.

Signed and Sealed this
Eleventh Day of September, 2012

David J. Kappos
*Director of the United States Patent and Trademark Office*